Feb. 12, 1952 — E. M. CLAYTOR — 2,585,437
OVERDRIVE CONTROL
Filed Aug. 11, 1949 — 2 SHEETS—SHEET 1
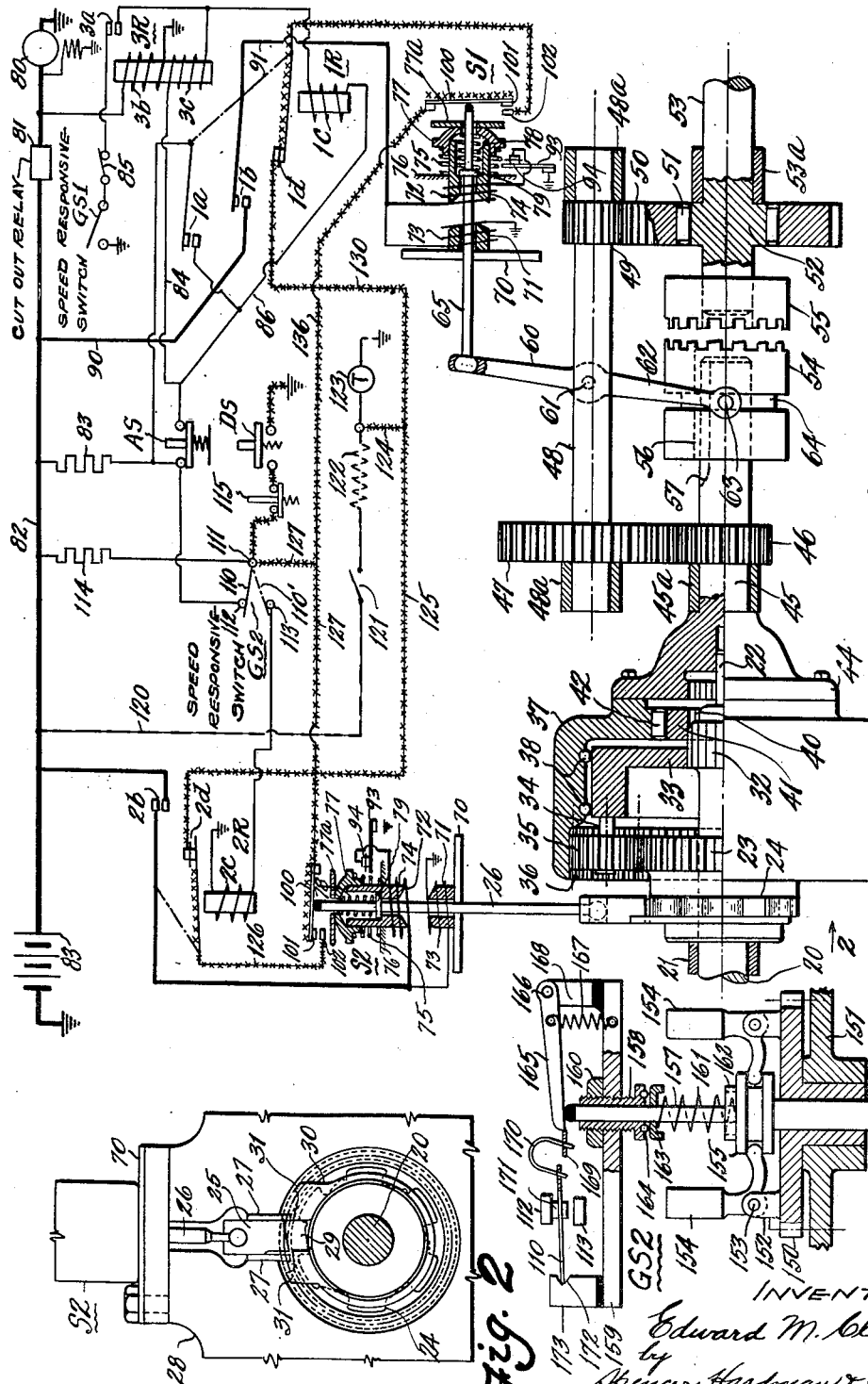
INVENTOR
Edward M. Claytor
by
Spencer Hardman & Fehr
his ATTORNEYS INVENTOR
Edward M. Claytor
by Spencer Hardman & Fehr
his ATTORNEYS Patented Feb. 12, 1952

2,585,437

UNITED STATES PATENT OFFICE 2,585,437

OVERDRIVE CONTROL

Edward M. Claytor, Anderson, Ind., assignor to General Motors Corporation, Detroit, Mich., a corporation of Delaware Application August 11, 1949, Serial No. 109,789

9 Claims. (Cl. 192—4)

This invention relates to overdrives used on automotive vehicles whereby, in response to an intermediate vehicle speed, the gearing is automatically changed from low to intermediate speed and whereby, in response to a certain higher vehicle speed, the gearing is changed from intermediate to high speed.

The object of the invention is to provide a system of electrical control by which the gear ratio changing mechanisms are controlled by electromagnets or solenoids and the operation of a solenoid to effect the change from a higher to a lower ratio of engine speed relative to axle speed is under joint control by a speed responsive switch and a switch which is momentarily closed by release of the accelerator pedal. To change from a lower to a higher ratio of engine speed relative to axle speed, the solenoid is under control by a manually operated down speed switch and by the opening of an accelerator switch when the accelerator pedal is moved to increase engine power. The system provides for momentarily rendering the engine inoperative to facilitate operation of the mechanisms when shifting from a lower to a higher speed ratio. In this specification, the terms "high," "medium" and "low" are used in the ordinary sense to mean, respectively, gearing for high vehicle speed, for medium vehicle speed and low vehicle speed.

A further object of the invention is to prevent a free wheeling condition when going down hill, or when the brakes are applied. This is accomplished by a switch in the circuit of the down speed switch to prevent shifting from high to medium or from medium to low speeds. This switch is automatically controlled by the brake system when the brakes are applied or can be manually controlled when going down hill and using the engine as the brake.

Further objects and advantages of the present invention will be apparent from the following description, reference being had to the accompanying drawings, wherein a preferred embodiment of the present invention is clearly shown.

In the drawings:

Fig. 1 is the diagram showing the mechanical connection between an engine shaft and a propeller shaft and a diagram of the electrical control.

Fig. 2 is a view in the direction of arrow 2 of Fig. 1.

Fig. 3 is a diagram of a speed responsive switch.

Figure 4:
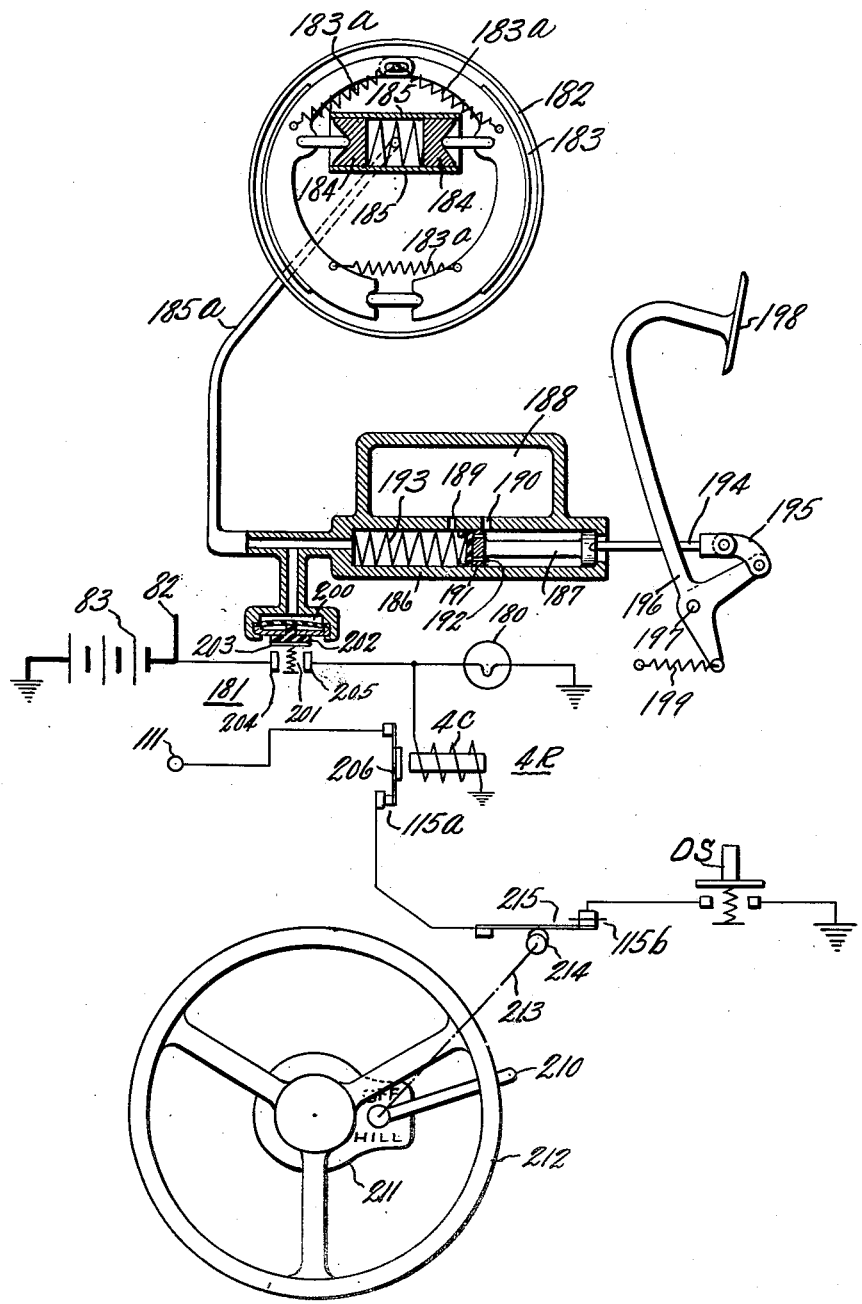
Fig. 4 is a diagram supplementing Fig. 1.

Referring to Fig. 1, the shaft 20 is driven by the engine preferably through a clutch (not shown) which automatically closes at an engine speed above idling speed. Shaft 20 is journaled in a bearing 21 and provides a journal 22 for supporting a coupling 44. A sun gear 23 is supported by shaft 20 but is not connected therewith. Gear 23 is connected with a notched disc 24 adapted to receive a locking pawl 25 attached to a pawl rod 26 and guided by bosses 27 (Fig. 2) provided by a part of the gear housing 28. In order that the pawl 25 may be received by a notch of the disc, it is necessary that a notch 29 of a blocker disc 30 be located in alignment with the pawl 25, as shown in Fig. 2. Normally this notch 29 is out of alignment with the pawl 25 because the sun gear 23, when rotating with the shaft 22, moves blocker plate 30 through a frictional connection with the gear 23 so that one of the lugs 31 of the plate 30 will normally engage one of the bosses 27.

Shaft 20 has an externally splined portion 32 received by internal splines in a disc 33 supporting a plurality of studs 34 on which are journaled planet gears 35 meshing with the sun gear 23 and a ring gear 36 provided by a shell 37 journaled on disc 33 by ball bearings 38. Splined portion 32 is received by internal splines 40 in the inner member 41 of a one-way clutch having rollers 42 through which the member 41 drives the outer clutch member which is provided by shell 37.

Shell 37 is connected with a coupling 44 integral with a shaft 45 connected with a gear 46 meshing with a gear 47 connected with a countershaft 48 which drives a gear 49 meshing with a gear 50. Gear 50 provides the outer member of a one-way clutch having rollers 51 through which gear 50 drives an inner clutch member 52 integral to or attached to the propeller shaft 53 of the vehicle. Bearings 45a, 48a and 53a support shafts 45, 48 and 53 respectively.

Shafts 45 and 53 are directly connectible by clutch members 54 and 55, connectible respectively with these shafts. Clutch 54 is connected with shaft 45 by a key 56 engaging a longitudinal groove 57 in this shaft. Engagement of clutch member 54 with 55 is effected by counterclockwise movement of lever 60 pivoted at 61 and having a forked arm 62 carrying studs 63 which engages groove 64 in clutch member 54. Lever 60 is connected with a rod 65. When rod 65 is moved left, clutch member 54 will move into engagement with clutch member 55 and shafts 45 and 54 will be directly connected for medium vehicle speed. The one-way clutch, which includes rollers 51, permits clutch member 52 to overrun gear 50.

The shift from medium to high is effected by causing downward movement of rod 26 and such torque reversal as will cause the blocker plate 30 to move its notch 29 into alignment with the pawl. When the pawl 25 is received by a notch in the locking disc 24, the sun gear 23, which had been rotating when the transmission was in low and medium, is stopped. Therefore, planet gears 35 are caused to roll around the sun gear 23; and the ring gear 36 provided by the shell 37 is caused to rotate faster than shaft 22. The one-way clutch, which includes rollers 42, permits shell 37 to overrun member 41 connected with shaft 20.

The movements of rods 65 and 26 are controlled by identical solenoids S1 and S2, respectively. Each solenoid comprises a base 70 which, as shown in Fig. 2, is attached to transmission housing 28. Base 70 (Fig. 1) supports a core 71 surrounded by a main armature attracting coil 72 and an armature holding coil 73. When these coils are energized, an armature 74 is caused to move toward the core 71 against the action of a spring 75 confined between a fixed part 76 of the solenoid and a nut 77 attached to the armature. Spring 75 normally holds the nut against a stop 77a. As nut 77 moves toward the core 71, it applies force through a spring 78 to the shoulder 79 of a rod which is rod 65 of solenoid S1 or rod 26 of solenoid S2. If movement of rod 65 toward the left is arrested by abutting the teeth of clutch members 54 and 55 before they become connected, the spring 78 will be compressed. When there is a momentary reversal of torque transmission in which the vehicle propeller shaft 53 momentarily becomes the driving member, the teeth abutment is relieved and the clutch members 54 and 55 engage. This torque reversal is effected by momentarily lifting the foot from the accelerator pedal so that engine power will decrease while the vehicle continues on its own momentum. Similarly, with respect to the solenoid S2, when the motion of pawl 25 is arrested by the blocker 30, the spring 78 will be compressed. Release of the accelerator pedal causes reversal of torque transmission such that the blocker plate 30 will turn to bring its notch 29 into alignment with the pawl.

The solenoid windings are connectible with a current source which is a generator 80 driven by the vehicle engine and connected by a reverse current or cut-out relay 81 and wire 82 with a storage battery 83 which the generator charges when the cut-out relay is closed. As known to those skilled in the art, this relay closes in response to the attainment of a certain generator voltage. When this voltage is attained, coil 3b of a relay 3R will be energized and its contacts 3a will close. Relay 3R is provided so that the overdrive control system cannot be operated unless the generator is functioning properly when the transmission is in low.

If relay contacts 3a are closed at a predetermined medium vehicle speed, a speed responsive or governed switch GS1 closes. There is a switch AS normally closed when the accelerator pedal is released. To shift from low to medium, the driver releases the accelerator pedal so that switch AS closes. Then the following circuits are established: wire 82, resistor 83, switch AS, wire 84, coil 3c of relay 3R which is a hold-in coil which will keep the contacts 3a closed although energization of coil 3b might be insufficient due to decrease of generator voltage when pressure on the accelerator pedal is relieved. The circuit continues from coil 3c to contacts 3a, a normally closed disabling switch 85 and switch $GS^1$ to ground. Another circuit is also established: wire 82, resistance 83, switch AS, wire 86, coil 1c of a relay 1R, contacts 3a, switch 85, switch GS1. When coil 1c is energized normally open contacts 1a and 1b close and normally closed contacts 1d open. The closing of contacts 1a provides a short circuit around switch AS so that energization of coil 1c is maintained although switch AS is opened by depression of the accelerator pedal to increase engine power and vehicle speed. The opening of contacts 1d at this time is necessary to prevent disabling of the ignition apparatus. When contacts 1b close, the coils 71 and 72 of solenoid S1 receive current through the following circuit: wire 82, wire 90, contacts 1b, wire 91, coils 71 and 72 to ground. The armature 74 of solenoid S1 then moves to the left to effect the engagement of clutch members 54 and 55, in order to effect the change of transmission from low to medium. Left movement of the armature 74 is accompanied by a left movement of nut 78 which engages a blade 93 carrying one of a pair of contacts 94 which are in series with the coil 72. Therefore, when the armature 74 is fully attracted coil 72 is open circuited and the armature held in this fully attracted position by coil 71 alone. Coil 72 has fewer turns of coarse wire and coil 71 more turns of finer wire. Therefore, the current consuming coil 72 is open circuited and current is conserved. Left movement of rod 65 produced by left movement of armature 74 releases pressure on the spring blade 100 carrying a contact 101 adapted to engage a contact 102. Therefore contacts 101 and 102 are closed while the transmission is in medium.

As vehicle speed is increased by increasing engine power while the transmission is in medium status, a speed responsive or governor switch GS2 causes its movable contact 110 connected with a terminal 111 to move from a contact 112, which it normally engages, into engagement with a contact 113. Then the following circuit is established: wire 82, resistance 114, terminal 111, switch 110 at 110', contact 113, coil 2c of a relay 2R to ground. When coil 2c is energized normally closed contacts 2d open and normally open contacts 2b close. The functions of contacts 2d and 2b and relay 2R are identical with the function of contacts 1d and 1b of relay 1R. The opening of contacts 2d prevents rendering the ignition inoperative until the proper time and the closing of contacts 2b causes solenoid S2 to operate in the manner of operation of solenoid S1. Therefore, to change the transmission from medium to high after governor switch GS2 closes at higher vehicle speed, release of the accelerator pedal will cause a shifting of blocker 30 whereupon the solenoid S2 then having been energized will shift the sun gear locking pawl 25 into engagement with the sun gear locking disc 24. The transmission is now in high.

When it is desired to shift from high to intermediate the driver presses the switch DS into closed position to establish a short circuit of coil 2c, said short circuit including switch DS and a switch 115 which is normally closed. The function of switch 115 will be described later. When coil 2c is short circuited, contacts 2d return to closed position and contacts 2b are open. The hold-in coil 73 of solenoid S2 is deenergized and spring 77 attempts to retract the pawl 25. In order that it may do so, it is necessary to relieve engine torque and this is done by rendering the ignition temporarily inoperative. The ignition system of the engine is represented diagrammatically by wire 120, connected with wire 82, ignition switch 121 closed when the ignition is operating, ignition coil primary winding 122 and ignition circuit breaker or timer 123 connected to ground. The ignition is rendered inoperative by short circuiting the timer 123. This short circuit, indicated by small x's, includes wires 124, 125, contacts 2d, wire 126, contacts 101 and 102 of solenoid S2 (closed when rod 26 is down), blade 100, wire 127, terminal 111, switch 115, switch DS to ground. The ignition being inoperative, the engine becomes inoperative and pressure between the disc 24 and the pawl 25 is relieved. Then the spring 77 of solenoid S2 is able to retract the pawl 25 by upward movement of rod 26 which, near the end of its upward movement, separates contacts 101 and 102 thereby opening the short circuit of the timer 123 so that the ignition is again operative.

The transmission having been shifted from high to medium, the driver can release pressure on the switch DS and a spring opens it. Vehicle speed having been reduced by change in transmission from high to medium, governor switch GS2 moves its contact 110 away from contact 113 into engagement with contact 112. If the driver wishes to return the transmission to high, he depresses the accelerator pedal in order to increase vehicle speed so that the governor switch GS2 will move contact 110 again into engagement with contact 113 and solenoid S2 will function as stated. If the driver wishes to shift from intermediate to low, he releases pressure on the accelerator pedal to allow the engine power to decrease and vehicle speed will decrease below that which will keep the governor switch GS1 open. The opening of switch GS1 opens the circuit coil 1c of relay 1R. Therefore, contacts 1d will close and contacts 1b and 1a will open and coil 73 of solenoid S1 open circuited and spring 77 will attempt to move rod 65 toward the right and lever 60 clockwise. To be sure that this operation takes place against the force of friction between the teeth of clutch members 54 and 55, the engine torque is temporarily relieved by momentarily shorting the ignition timer through the following circuit: wire 124, wire 130, contacts 1d then closed, contacts 101 and 102 (closed when rod 65 is in clutch engaging position), blade 100, wire 136, wire 127 and terminal 111, switch 115 and switch DS then closed.

Fig. 3 shows a form of speed responsive switch GS1 or GS2. A gear 150, which is driven by the vehicle and is supported by a fixed bearing 151, carries lugs 152 supporting pins 153 on which weighted levers 154 are supported. Levers 154 are connected with a grooved collar 155 having rods 156 and 157 extending therefrom. Rod 156 is received by a central hole in gear 150. Rod 157 extends through a bushing 158 threaded into a fixed plate 159 and secured in adjusted position by a nut 160. The adjustment of bushing 158 determines the compression of a governor control spring 161 surrounding rod 157 and retained by a seat 162 provided by collar 155 and by a seat 163 which a thrust bearing 164 spaces from bushing 158. The non-conducting upper end of the rod 157 is engageable with a lever 165 pivotally supported at 166 by a post 168 supported by plate 159 and insulated therefrom. A spring 167 connecting plate 159 with lever 165 urges the latter counterclockwise. The free end portion 169 of lever 165 receives one end of a U-shaped spring 170 whose other end is received by blade 110 (of switch GS2) which the spring 170 urges left into a fulcrum notch 172 of a post 173 supported by plate 159 and insulated therefrom. Normally collar 155 rests on gear 150 and spring 170 urges blade 110 counterclockwise so that a contact 171 carried thereby engages the contact 112. When vehicle speed attains a certain value, the left end of lever 165 will be above the right end of blade 110 and spring 170 will cause rapid clockwise movement of blade 110 to disconnect it from contact 112 and to connect it with contact 113. Similarly when vehicle speed falls to a certain value, and the left end of lever 165 drops below the right end of blade 110 then in the last mentioned position, spring 170 will cause the blade 110 to move quickly counterclockwise to separate it from contact 113 and to cause it to engage contact 112.

Governor switch GS1 would have a lower contact corresponding to contact 113 of Fig. 3 and an upper stop corresponding to part 112 of Fig. 3.

The switch shown in Fig. 3 is merely an example of suitable construction of the switches GS1 and GS2.

Whenever there is a change in transmission status from high to medium or from medium to low effected in consequence of closing switch DS, a condition of free wheeling is introduced by reason of overrunning clutches which include the rollers 42 and 51. The function of switch 115 is to open the circuit of switch DS, so that inadvertent closing of switch DS will not be effective to introduce a free wheeling condition when it is desirable to use the engine as a brake as well as the vehicle brakes to stop the vehicle or to assist the vehicle brakes when passing down a steep grade. Switch 115 can be coordinated with the brake applying mechanism so that it will open when brakes are applied or it can be manually opened independent of brake application so that the engine can be used as a brake regardless of vehicle brake application.

In order to show how the circuit of the down-switch DS can be interrupted manually and automatically, reference is made to Fig. 4 which shows, in series with terminal 111 and switch DS, two pairs of normally closed contacts 115a and 115b. Contacts 115a are part of a relay 4R whose coil 4c, when energized, separates them. Coil 4c is in parallel with a stop light 180 which burns when a stop light switch 181 closes in response to application of brakes. A conventional hydraulic brake system shown diagrammatically in Fig. 4 includes a brake drum 182 engageable by brake shoes 183 connected with pistons 184 in a cylinder 185 which a pipe 185a connects with a cylinder 186 in which a piston 187 slides. Hydraulic fluid in a reservoir 188 can pass into cylinder 186 through ducts 189 and 190. The left end of piston 187 has holes 191 leading to the back of a soft rubber cup 192 which a piston return spring 193 urges against the left end of piston 187. Rod 194 and link 195 connect piston 187 with a brake lever 196 pivoted at 197 and providing a pedal 198. A spring 199 urges the lever 196 clockwise. When the pedal 198 is pushed down, piston 187 moves left to force fluid into the brake cylinder 185 to cause separation of the pistons 184 and engagement of shoes 183 with drum 182 attached to a vehicle wheel. At the same time a diaphragm 200 is caused to flex downwardly against the action of a spring 201 and cause a contact support 202 to move a switch contact 203 into engagement with contacts 204 and 205 of switch 181, thus connecting the wire 82 (connecting battery 83 with generator 80, Fig. 1) with the lamp 180 and the relay coil 4c. Contacts 115a are separated so that no down shift or change from higher to lower ratio can take place although switch DS might be closed. When the pedal 198 is released and is returned by spring 199 to normal position, spring 193 pushes the piston 187 right and fluid pressure is relieved on the pistons 184 which shoe retracting springs urge together and force fluid from the cylinder 185 through pipe 185a to cylinder 186. If pedal 198 is released quickly, the left end of cylinder 186 can receive fluid passing from reservoir 188 through duct 190 and ducts 191 and around the rubber cup 192. Therefore the return of piston 187 is not retarded by return flow through pipe 185a; and fluid pressure falls immediately following release of pedal 198 and switch 181 opens and coil 4c is deenergized and contacts 115a close by virtue of the action of a spring blade 206 which supports one of them.

The switch contacts 115b are controlled by a lever 210 supported by a steering column 211 which supports a steering wheel 212. Lever 210 is connected with a shaft 213 connected with a cam 214 which engages a blade 215 carrying the lower one of the contacts 115b. Normally lever 210 is in the off-hill position indicated by off marked on the steering column. When it is desirable to use the engine as a brake on going down a steep grade regardless of use of the vehicle brakes, the driver moves the lever 210 clockwise to hill position, thereby causing the cam 214 to release the blade 215 which is biased downwardly, for separation of contacts 115b, thereby nullifying the effect of the closing of down-switch DS, although the vehicle brakes may not be applied and contacts 115a may remain in engagement.

While the embodiment of the present invention as herein disclosed, constitutes a preferred form, it is to be understood that other forms might be adopted.

1. A system of control for a variable speed transmission for an automotive vehicle and comprising a member movable in one direction from normal position to effect a decrease in the ratio of engine speed to vehicle axle speed and in the opposite direction to increase the ratio, a solenoid having an armature connected with said member and having windings, energization of which causes movement of the member in the first mentioned direction, a spring opposing movement of the armature and operable to return the member to normal position when the solenoid windings are deenergized, a current source, a relay having normally open contacts for connecting, when closed, the solenoid windings with a current source, a relay magnet coil, the energization of which effects closing of the relay contacts, a circuit for connecting the relay magnet coil with a current source and including a switch which closes upon the attainment of a certain vehicle speed and, in series therewith, a switch which is closed by release of the accelerator pedal of the vehicle, a circuit in parallel with the relay coil and its control switches and including a manually operated, normally open down-shift switch, the closing of which short circuits the relay coil whereby the solenoid is ineffective to oppose the return spring, and means for momentarily rendering the engine inoperative in order to facilitate action of the return spring to move said member to normal position, said means comprising a short circuit paralleling a portion of the ignition apparatus and including, in series, a switch which is closed when the member moves in the first mentioned direction, a second pair of relay contacts which close when the relay coil is deenergized and said manually operated switch is closed.

2. A system according to claim 1 in which the relay has a pair of normally open contacts in parallel with the accelerator pedal controlled switch, the energization of the relay coil causing said contacts to close to by-pass the accelerator pedal controlled switch.

3. A system according to claim 1 in which the control circuit of the relay coil includes a pair of normally open contacts, in which the current source is a generator driven by the vehicle engine, and in which means are provided for effecting closure of said contacts upon the attainment of a certain generator voltage.

4. A system according to claim 1 in which the control circuit of the relay coil includes a pair of normally open contacts, in which the current source is a generator driven by the vehicle engine, a second relay which includes said contacts and a first magnet coil connected with the generator whereby the contacts close in response to attainment of a certain generator voltage and which includes a second or holding magnet coil in parallel with the magnet coil of the first relay and in series with the accelerator pedal controlled switch, the contacts of the second relay and the vehicle speed responsive switch, and in which the first relay has a pair of normally open contacts in parallel with the accelerator pedal controlled switch, the energization of the coil of the first relay causing the contacts last mentioned to close to by-pass the accelerator pedal controlled switch whereby the circuit of the coil of the first relay and the second coil of the second relay are maintained independently of the accelerator pedal controlled switch.

5. A system according to claim 1 in which there is placed, in series with the normally open, manually closed down-shift switch, a normally closed switch under control by the driver for the purpose of nullifying the effect of inadvertent closing of the down-shift switch.

6. A system according to claim 1 in which there is placed, in series with the normally open, manually closed down-shift switch, a normally closed switch which is caused to open automatically in response to application of brakes for the purpose of nullifying the effect of inadvertent closing of the down-shift switch.

7. A system of control for a variable speed transmission for an automotive vehicle and comprising first and second members, each movable from a normal position in a direction to effect a decrease in the ratio of engine speed to vehicle axle speed and in the opposite direction to increase the ratio, first and second solenoids associated, respectively, with said members and each including an armature connected with a member and windings which, when energized, cause movement of a member in the first mentioned direction, springs each for moving a member in the opposite direction, a current source, first and second relays having normally open contacts which, when closed, respectively connect windings of the first and second solenoids with the current source and each having a magnet coil, first and second speed responsive switches operative, upon attainment of medium and higher vehicle speeds, respectively, to connect the first and second relay coils, respectively, with the current source, said second speed responsive switch including a movable contact having a normal contact making position which it occupies at vehicle speeds below the speed at which the second relay coil is connected with the current source, a circuit for shorting the second relay coil and including a normal open, manually closed switch in parallel with the second relay coil and second speed responsive switch and a circuit for shorting the first relay coil including said manually closed switch and the movable contact of the second speed responsive switch when in normal position.

8. A system according to claim 6 further characterized by means for momentarily rendering the engine ignition inoperative and comprising two circuits each in parallel with a portion of the ignition apparatus and each including a pair of normally open switch contacts and a pair of normally closed switch contacts, the pairs of normally open contacts being associated, respectively, with the solenoids and closed in response to magnetic attraction of the solenoid armatures, the pairs of normally closed contacts being parts respectively of the relays and closing when the relay coils are deenergized, and said means including also the normally open, manually closed switch in series with said parallel circuits.

9. A system of control for the transmission of an automotive vehicle comprising a member movable from a normal position in one direction to effect an increase in the ratio of engine speed to vehicle axle speed and in the opposite direction to reduce the ratio, a solenoid having an armature connected with said member and windings, the energization of which cause the armature to move the member in the first mentioned direction, a spring opposing said movement of the armature and operable to move the member in the opposite direction when the windings are deenergized, a relay having a coil, means for effecting energization of the coil in response to attainment of a certain vehicle speed, normally open relay contacts closed by energization of the relay coil to cause the solenoid windings to become energized, circuits for short-circuiting the relay coil and for rendering the vehicle engine ignition apparatus non-operative and including, in series, a normally closed switch and a normally open switch both under control by the driver and means for opening the normally closed switch automatically in response to the application of vehicle brakes.

EDWARD M. CLAYTOR.

REFERENCES CITED

The following references are of record in the file of this patent:

UNITED STATES PATENTS

| Number | Name | Date |
|---|---|---|
| 2,260,759 | Surdy | Oct. 28, 1941 |
| 2,281,916 | Claytor | May 5, 1942 |
| 2,309,051 | Dodge | Jan. 19, 1943 |
| 2,330,407 | Claytor | Sept. 28, 1943 |
| 2,375,031 | Orr | May 1, 1945 |